Nov. 12, 1929.                G. ZITZMANN                1,735,593
                          IGNITION TESTER GAUGE
                          Filed Aug. 23, 1927
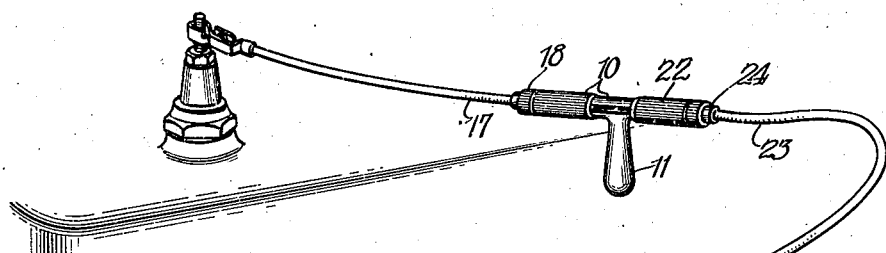
Fig. 1.
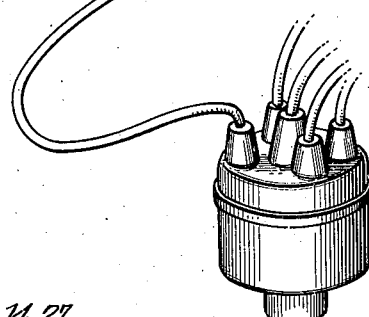
Fig. 2.
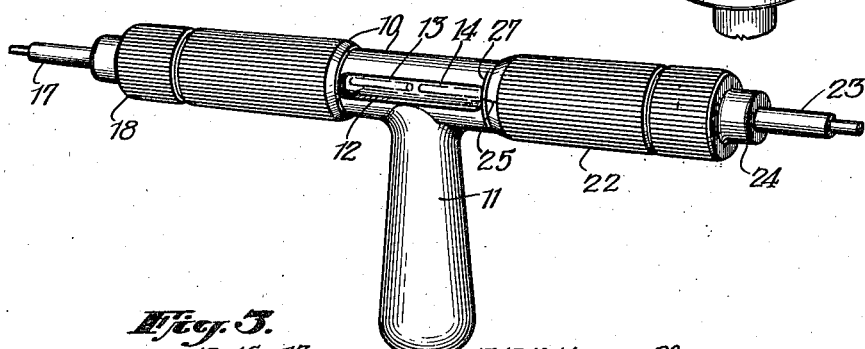
Fig. 3.
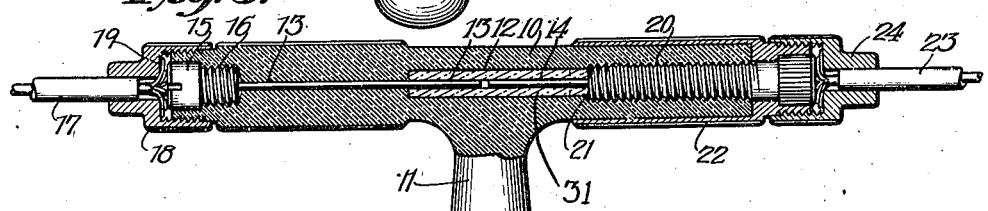
Fig. 4.
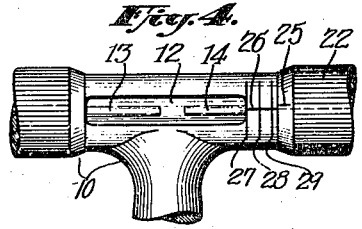
Inventor
George Zitzmann
By his Attorney
Frank H. Kent Patented Nov. 12, 1929

1,735,593

UNITED STATES PATENT OFFICE

GEORGE ZITZMANN, OF YONKERS, NEW YORK

IGNITION-TESTER GAUGE

Application filed August 23, 1927. Serial No. 214,829.

This invention relates to adjustable spark gaps of the type used particularly in testing the condition of the ignition systems of internal combustion engines.

It is the purpose of this invention to provide a convenient hand tool that can be expeditiously attached to the parts to be tested without removing or replacing any of the elements of the system.

The invention aims to furnish a sturdy and compact tool operated by screw mechanism so that the adjustable points of the gauge can be carefully moved relative to each other and accurate readings can be taken of the exact spaced relation of the two movable points at any particular setting.

While a preferred embodiment of the invention has been disclosed for purposes of illustration it should be understood that various changes may be made in the structure without departing from the spirit and scope of the invention as hereinafter set forth and claimed.

In the drawings:

Fig. 1 is a general perspective showing the gauge being used for testing a spark plug.

Fig. 2 is a perspective of the gauge.

Fig. 3 is a longitudinal section through the gauge.

Fig. 4 is a fragmentary elevation of the central portion of the gauge.

Referring to the drawings more particularly, the main body of the gauge is composed of a cylinder 10 having a handle 11 extending therefrom, the body being molded from hard rubber or other suitable insulating material.

A bore 12 is formed in the central part of the cylinder and extending through to the front face of the cylinder, as will be clear from Fig. 2.

Two electrodes 13 and 14 are mounted along the central axis of the cylinder 10, electrode 13 being stationary, while electrode 14 is adjustable. The electrode 13 extends through the left-hand end of cylinder 10 and has its inner end projecting into the bore 12, while its outer end is connected to the screw 15 which extends into the counter bore 16. An attaching wire 17 is held in electrical contact with electrode 13 by having its end spread as at 19 and clamped against the head of screw 15 by means of a cap 18 which has threaded engagement with the end of cylinder 10.

The adjustable electrode 14 is mounted on a screw 20 which has threaded engagement with the counter bore 21 on the right hand end of the cylinder 10, the inner end of electrode 14 extending into the bore 12. An adjusting sleeve 22 surrounds the right hand end of cylinder 10 and is secured to the screw 20 in such a manner that rotation of sleeve 22 causes rotation of screw 20, thereby causing longitudinal movement of the adjustable electrode 14. The attaching wire 23 is held in contact with the outer end of screw 20 by a cap 24 in a manner similar to that already described in connection with cable 17. A suitable attaching clip of any preferred type is secured to the outer end of each of the cables 17 and 23.

An indicating mark 25 carried by sleeve 22 cooperates with a longitudinal mark 26 on the cylinder 10 to indicate the completion of a single rotation of sleeve 22, while marks 27, 28 and 29 indicate certain amounts of separation of the electrodes, and may carry any suitable legends.

The parts are so arranged that when electrode 14 is at the inner end of its movement the points are 2½ millimeters apart, and the end of sleeve 22 is at the mark 27. In this position the gauge can be used to test the coil, failure of the spark to jump the gap indicating a bad coil.

Every complete rotation of sleeve 22 moves the points 1 mm. farther apart, so that when the end of sleeve 22 is at mark 28 the points are 5 mm. apart and the gauge is in position for testing the condenser. At the mark 29 the points are 7 mm. apart and the gauge is in position for testing a high tension ignition wire.

A transparent sleeve 30 of glass or similar material may be mounted in the bore 12 to cover and protect the points of the electrodes.

Other uses and advantages of this invention will be evident to those skilled in the art.

I claim:—

An ignition gauge comprising a cylindrical body formed of insulating material and having a sight opening at one side thereof, a stationary electrode extending into one end of the body and provided with a head exposed at the end of the body, a screw threaded into the opposite end of the body, an electrode carried by the screw and movable to and from the first electrode upon rotation of said screw, a sleeve extending over the last mentioned end of the body and having an opening into which the head of the screw fits to revolve with the sleeve, said last screw head being exposed at the end of the sleeve, cooperating indicating means on the body and sleeve for indicating the position of the movable electrode, clamp caps screwed on the first end of the body and the end of the sleeve respectively, and conductor wires extending into said caps and clamped thereby against the respective screw heads.

In testimony whereof I affix my signature.

GEORGE ZITZMANN.